United States Patent
Ko et al.

(10) Patent No.: US 11,316,219 B2
(45) Date of Patent: *Apr. 26, 2022

(54) METAL AIR BATTERY INCLUDING MULTI MODULE AIR SUPPLY UNIT

(71) Applicant: Samsung Electronics Co., Ltd., Suwon-si (KR)

(72) Inventors: Jeongsik Ko, Hanam-si (KR); Hyukjae Kwon, Suwon-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 214 days.

This patent is subject to a terminal disclaimer.

(21) Appl. No.: 16/665,193

(22) Filed: Oct. 28, 2019

(65) Prior Publication Data

US 2020/0058977 A1 Feb. 20, 2020

Related U.S. Application Data

(63) Continuation of application No. 15/607,788, filed on May 30, 2017, now Pat. No. 10,497,999.

(30) Foreign Application Priority Data

Nov. 30, 2016 (KR) .................. 10-2016-0162300

(51) Int. Cl.
| | |
|---|---|
| *H01M 12/06* | (2006.01) |
| *H01M 8/04746* | (2016.01) |
| *H01M 8/0662* | (2016.01) |
| *H01M 8/0438* | (2016.01) |
| *H01M 12/08* | (2006.01) |

(Continued)

(52) U.S. Cl.
CPC ......... *H01M 12/06* (2013.01); *H01M 4/9016* (2013.01); *H01M 8/04089* (2013.01); *H01M 8/04425* (2013.01); *H01M 8/04753* (2013.01); *H01M 8/04776* (2013.01); *H01M 8/0662* (2013.01); *H01M 8/18* (2013.01); *H01M 12/08* (2013.01); *B01D 53/047* (2013.01); *B01D 53/0462* (2013.01); *Y02E 60/10* (2013.01)

(58) Field of Classification Search
None
See application file for complete search history.

(56) References Cited

U.S. PATENT DOCUMENTS

| | | |
|---|---|---|
| 9,543,626 B2 | 1/2017 | Albertus et al. |
| 2011/0200850 A1 | 8/2011 | Gottwick .......... H01M 8/04014 429/9 |

(Continued)

FOREIGN PATENT DOCUMENTS

| | | |
|---|---|---|
| JP | 2016517130 A | 6/2016 |
| KR | 1020160024609 A | 3/2016 |
| KR | 1020160067463 A | 6/2016 |

*Primary Examiner* — Daniel S Gatewood
(74) *Attorney, Agent, or Firm* — Cantor Colburn LLP

(57) ABSTRACT

A metal air battery includes a multi module air supply unit having air suction units or air purification units in a parallel arrangement. The metal air battery further includes a battery module including a metal air cell and the air supply unit which supplies the air to the battery module. The air supply unit includes an air suction unit which suctions air and an air purification unit that adsorbs impurities such as moisture and nitrogen from the suctioned air. The air suction unit or the air purification unit may be provided in plural to be in a parallel arrangement to define the multi module air supply unit.

19 Claims, 6 Drawing Sheets

(51) Int. Cl.
  *H01M 4/90* (2006.01)
  *H01M 8/04089* (2016.01)
  *H01M 8/18* (2006.01)
  *B01D 53/047* (2006.01)
  *B01D 53/04* (2006.01)

(56) References Cited

U.S. PATENT DOCUMENTS

| | | | |
|---|---|---|---|
| 2016/0064786 A1 | 3/2016 | Ko | H01M 12/08 429/407 |
| 2016/0164153 A1 | 6/2016 | Kim | H01M 8/04201 429/405 |

METAL AIR BATTERY INCLUDING MULTI MODULE AIR SUPPLY UNIT

CROSS-REFERENCE TO RELATED APPLICATION

This application is a continuation application of U.S. application Ser. No. 15/607,788 filed May 30, 2017, which claims priority to Korean Patent Application No. 10-2016-0162300, filed on Nov. 30, 2016, and all the benefits accruing therefrom under 35 U.S.C. § 119, the content of which in its entirety is herein incorporated by reference.

BACKGROUND

1. Field

The present disclosure relates to a metal air battery, and more particularly, to a metal air battery including a multi module air supply unit with two or more air suction units or air purification units in a parallel arrangement.

2. Description of the Related Art

A metal air battery includes a plurality of metal air cells. Each of the metal air cells includes an anode capable of intercalating and deintercalating ions and a cathode using oxygen from air as an active material. A reduction/oxidation of oxygen introduced from the outside the metal air battery occurs at the cathode, and an oxidation/reduction of a metal occurs at the anode. The metal air battery changes the chemical energy generated when the oxidation/reduction reaction occurs into electrical energy and outputs the electrical energy. For example, the metal air battery absorbs oxygen during discharging and emits oxygen during charging. As described above, since the metal air battery uses oxygen from the air, an energy density of the battery may significantly improve. For example, the metal air battery may have an energy density several times higher than an energy density of a conventional lithium ion battery.

In addition, since the metal air battery has a relatively low probability of ignition caused by an abnormally high temperature, the metal air battery has relatively high stability. Also, since the metal air battery is operated only by absorption and emission of oxygen without using a heavy metal, there is a relatively low probability of the metal air battery contaminating the environment. Due to such various advantages, much research into the metal air battery has been performed.

SUMMARY

According to an embodiment, a metal air battery includes a battery module which generates electricity, the battery module including a metal air cell which uses oxygen from air as a cathode active material to generate the electricity; and an air supply unit which is connected to the battery module and supplies the air to the battery module. The air supply unit includes an air suction unit which suctions air from outside, and an air purification unit connected to the air suction unit to receive suctioned air therefrom and remove impurities from the suctioned air. The air suction unit includes a plurality of air-handling modules connected in a parallel arrangement with each other to define a multi module structure of the air suction unit.

In an embodiment, the air suction unit further includes one air tank which stores the suctioned air; and as the plurality of air-handling modules of the air suction unit, a plurality of compressors connected in a parallel arrangement with each other, each compressor being connected to the one single air tank to suction air from the outside and provide the suctioned air to the one single air tank.

In an embodiment, the air suction unit further includes a plurality of air tanks each of which stores air; as the plurality of air-handling modules of the air suction unit, a plurality of compressors connected in a parallel arrangement with each other, the compressors being respectively connected to the plurality of air tanks to suction air from the outside and provide the suctioned air to a corresponding air tank; and a plurality of valves respectively connected to the plurality of air tanks to control an amount of air output from the plurality of air tanks.

In an embodiment, the metal air battery further includes a sensor unit including a plurality of pressure meters respectively connected to the plurality of air tanks of the air suction unit to measure an internal pressure in a corresponding air tank.

In an embodiment, the metal air battery further includes a controller connected to the sensor unit and to the air supply unit to receive internal pressure information of the plurality of air tanks of the air suction unit provided from the plurality of pressure meters of the sensor unit. The controller controls the plurality of valves of the air suction unit based on the internal pressure information to control the amount of air output from the plurality of air tanks.

In an embodiment, from among the plurality of air tanks of the air supply unit, the controller further controls the amount of air output from an air tank having the highest internal pressure to be a maximum amount, and controls the amount of air output from an air tank having the lowest internal pressure to be a minimum amount.

In an embodiment, from among the plurality of air tanks of the air supply unit, the controller further ceases the amount of air output from an air tank having an internal pressure less than a reference pressure by closing a valve connected to such air tank.

In an embodiment, from among the plurality of air tanks of the air supply unit, the controller further opens a valve of an air tank having the highest internal pressure and closes valves of remaining air tanks.

In an embodiment, the controller further opens the valve of the air tank having the highest internal pressure and closes the valves of remaining air tanks according to change of the internal pressure of the plurality of air tanks.

In an embodiment, from among the plurality of air tanks respectively connected to the plurality of compressors of the air supply unit, the controller operates a compressor connected to an air tank having an internal pressure less than a reference pressure until such air tank reaches a maximum pressure and ceases operation of a compressor connected to an air tank having an internal pressure which has reached the maximum pressure.

In an embodiment, air-handling capacities of the plurality of compressors are same.

In an embodiment, air-handling capacities of the plurality of compressors are different from each other.

In an embodiment, capacities of the plurality of air tanks are different from each other.

In an embodiment, the air purification unit includes a plurality of air-handling modules connected in a parallel arrangement with each other to define a multi module structure of the air purification unit.

In an embodiment, the air purification unit includes as the plurality of air-handling modules, a plurality of air purifiers connected in a parallel arrangement with each other, each air purifier receiving the suctioned air from the air suction unit to separate the impurities from the suctioned air and output a remainder of the suctioned air to the battery module.

In an embodiment, the plurality of air purifiers removes moisture and nitrogen from air by adsorption-desorption or removes moisture and nitrogen by an impurity separator.

In an embodiment, each of the air purifiers includes a first adsorption unit and a second adsorption unit each of which separates the impurities from the suctioned air. The first adsorption unit includes a first adsorbent which adsorbs impurities and a first regeneration unit which regenerates the first adsorbent, and the second adsorption unit includes a second adsorbent which adsorbs impurities and a second regeneration unit which regenerates the second adsorbent.

In an embodiment, each of the plurality of air purifiers operates according to a pressure swing adsorption ("PSA") method, a thermal swing adsorption ("TSA") method, a pressure thermal swing adsorption ("PTSA") method, or a vacuum swing adsorption ("VSA") method.

In an embodiment, each of the plurality of air purifiers includes an oxygen separator including a separation member, such oxygen separator separating nitrogen from the suctioned air, and a pump connected to the oxygen separator to output the suctioned air having the nitrogen removed therefrom to the battery module.

BRIEF DESCRIPTION OF THE DRAWINGS

These and/or other features will become apparent and more readily appreciated from the following description of the embodiments, taken in conjunction with the accompanying drawings in which.

DETAILED DESCRIPTION

Figure 1:
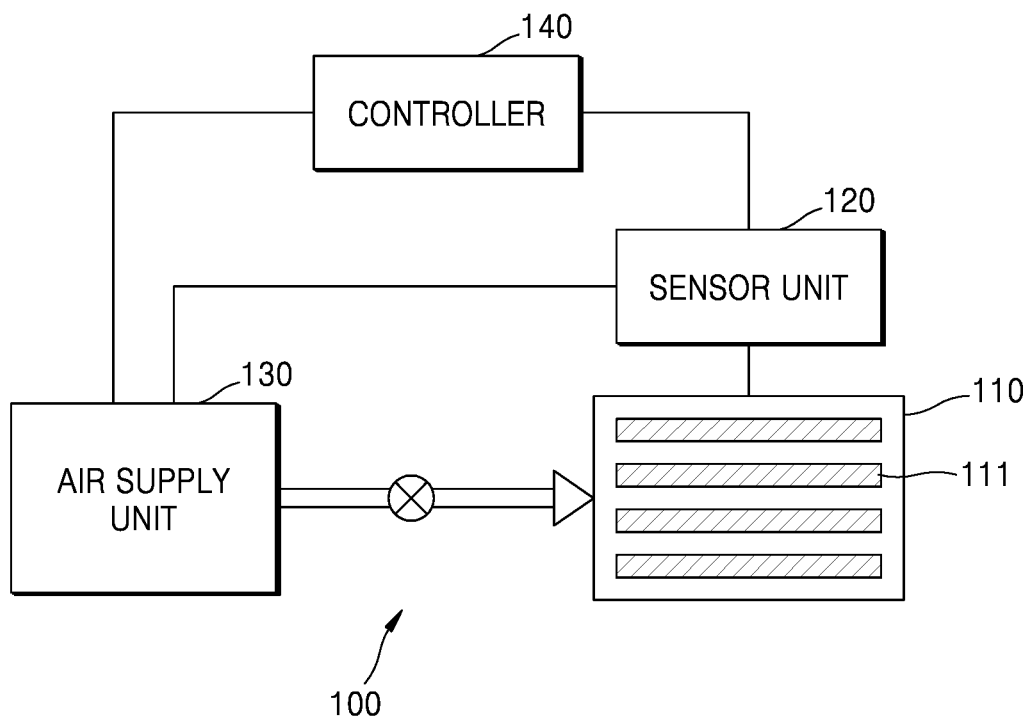
FIG. 1 is a block diagram schematically illustrating an exemplary embodiment of a structure of a metal air battery according to the invention.

Hereinafter, exemplary embodiments of a metal air battery including a multi module air supply unit will be described in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. In the drawings, the dimensions of elements are exaggerated for clarity of the invention. The following embodiments are merely examples, and various modifications may be made thereto.

It will be understood that when an element is referred to as being related to another element such as being "on," "connected to" or "coupled to" another element, it may be directly on, connected or coupled to the other element or intervening elements may be present. In contrast, when an element is referred to as being related to another elements such as being "directly on" another element, there are no intervening elements present. As two elements are described as being "connected," "coupled to," etc. to each other, such connection may indicate a physical, electrical and/or fluid connection.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram schematically illustrating an exemplary embodiment of a metal air battery 100 according to the invention. Referring to FIG. 1, the metal air battery 100 may include a battery module 110 which generates electricity and includes at least one metal air cell 111 that uses oxygen from air as a cathode active material; and an air supply unit 130 that supplies the air to the battery module. Also, the metal air battery 100 may further include a sensor unit 120 including a sensor (not shown) provided in plurality for an operation of the battery module 110 and the air supply unit 130; and a controller 140 that controls an operation of the air supply unit 130. The controller 140 may control an operation of the sensor unit 120. In an exemplary embodiment, for example, the sensor unit 120 may include a pressure meter (not shown) that measures a pressure in an air tank of the air supply unit 130; and an oxygen sensor that measures an oxygen concentration of air supplied from the air supply unit 130 to the battery module 110. The battery module 110, sensor unit 120, air supply unit 130 and controller 140 may be connected to each other, such as in mechanical, electrical and/or fluid communication with each other via ports and/or outlets.

The battery module 110 may include at least one metal air cell 111 using oxygen from air as a cathode active material. Each metal air cell 111 in the battery module 110 may generate electricity according to an oxidation of a metal and a reduction of oxygen. In an exemplary embodiment, for example, when a metal is lithium (Li), the metal air cell 111 may generate electricity through a reaction in which lithium (Li) reacts with oxygen to generate lithium oxide ($Li_2O_2$) during discharging. In the battery module 110 and/or the metal air cell 111, lithium (Li) may be reduced from lithium oxide and oxygen may be generated during charging.

Besides lithium (Li), various metals may also be used, and a reaction principal thereof may be substantially the same as lithium (Li). In an exemplary embodiment, for example, the battery module 110 may include at least one selected from sodium (Na) air cells, zinc (Zn) air cells, potassium (Ka) air cells, calcium (Ca) air cells, magnesium (Mg) air cells, iron (Fe) air cells, aluminum (Al) air cells, and alloy air cells including two or more of Na, Zn, Ka, Ca, Mg, and Fe.

As described above, since the battery module 110 uses oxygen during a discharging process, oxygen should be continuously supplied to the battery module 110. To supply oxygen to the battery module, the air supply unit 130 suctions air from the atmosphere (i.e., external to the metal air battery 100 or components thereof) and supplies the suctioned air to the battery module 110.

Figure 2:
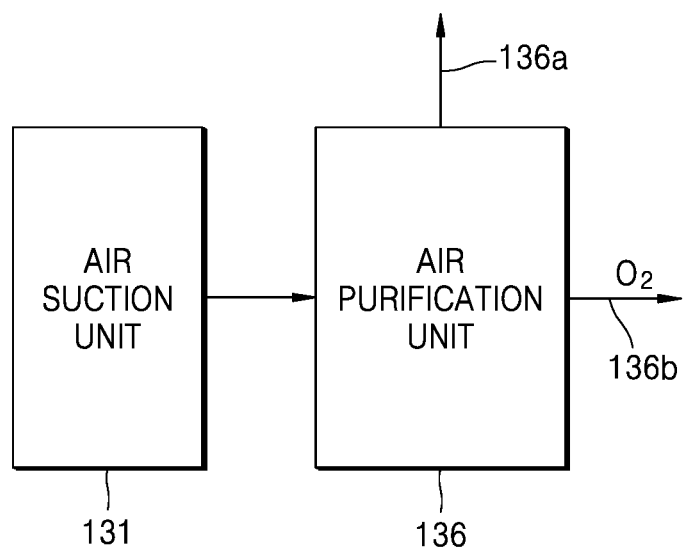
FIG. 2 is a block diagram schematically illustrating an exemplary embodiment of a structure of an air supply unit of the metal air battery shown in FIG. 1.

FIG. 2 is a block diagram that schematically illustrates an exemplary embodiment of a structure of the air supply unit 130 of the metal air battery 100 shown in FIG. 1. Referring to FIG. 2, the air supply unit 130 may include an air suction unit 131 that is configured to suction air from outside thereof; and an air purification unit 136 for removing impurities from the suctioned air of the air suction unit 131. The air suction unit 131, the air purification unit 136 and the controller 140 may be connected to each other, such as in mechanical, electrical and/or fluid communication with each other via ports and/or outlets.

The air suction unit 131 may be configured to control an amount of the suctioned air thereto according to or under control of the controller 140. Also, the air purification unit 136 may remove impurities from the suctioned air under control of the controller 140 to control an oxygen concentration in the air supplied to the battery module 110 to an optimum value. In an exemplary embodiment, for example, the air purification unit 136 may remove moisture and nitrogen from the suctioned air. When the air includes moisture, a lithium hydroxide may be produced during the discharging process of the metal air cell 111, and thus an energy density and lifespan of the metal air battery 100 may decrease. Also, an oxygen concentration in the air supplied to the battery module 110 may increase by removing nitrogen from the suctioned air. In an exemplary embodiment, for example, the air purification unit 136 may output moisture and nitrogen via a first outlet port 136a and may supply dry air with an increased oxygen concentration to the battery module 110 via a second outlet port 136b.

As a volume and a weight of the metal air battery 100 increase, an energy density of the metal air battery 100 may decrease. Therefore, when the metal air battery 100 is miniaturized while maintaining or improving overall performance of the metal air battery 100, an energy density of the metal air battery 100 may increase. According to one or more embodiment, when the metal air battery 100 has a multi module structure in which at least one of the air suction unit 131 and the air purification unit 136 of the air supply unit 130 is manufactured to include a multi module structure having a plurality of modules in a parallel arrangement, performance of the air suction unit 131 and/or the air purification unit 136 may be maintained or improved. At the same time, with the multi module structure described above, an energy density of the metal air battery 100 may increase by decreasing a volume and a weight of the air suction unit 131 and/or the air purification unit 136.

Figure 3:
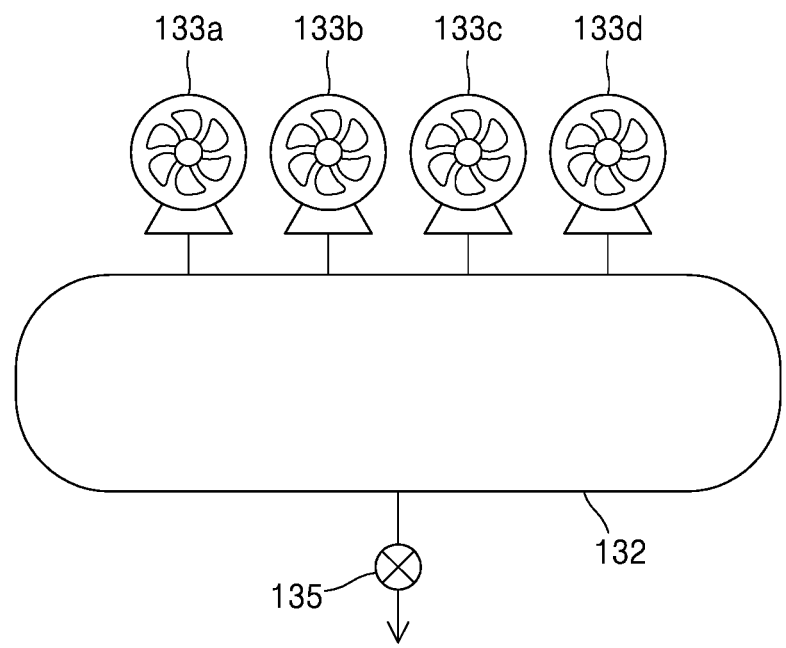
FIG. 3 is a schematic view of an exemplary embodiment of a structure of an air suction unit having a multi module structure according to the invention.

FIG. 3 is schematic view of an exemplary embodiment of a structure of the air suction unit 131 having a multi module structure according to the invention. Referring to FIG. 3, the air suction unit 131 may include an air tank 132 that stores air; a plurality of compressors 133a, 133b, 133c and 133d that are connected to the same air tank 132; and an output valve 135 that controls an amount of air output from the air tank 132 according to control of the controller 140. The air tank 132 may be commonly connected to each of the plurality of compressors 133a, 133b, 133c and 133d. Although FIG. 3 shows that four compressors 133a, 133b, 133c and 133d are connected to the same air tank 132 as an example, embodiments are not limited thereto. As shown in FIG. 3, the plurality of compressors 133a, 133b, 133c and 133d may be in a parallel arrangement. That is, each of the plurality of compressors 133a, 133b, 133c and 133d may suction air from the outside thereof or from outside the metal air battery 100 and supply the air to the air tank 132. A single air-handling module may include a compressor, the single one air tank and the single one output value which are connected to each other in series, but the invention is not limited thereto. In an exemplary embodiment, a single air-handling module may include a compressor among a plurality thereof connected to each other in a parallel arrangement.

In an exemplary embodiment of the air suction unit 131 shown in FIG. 3, the sensor unit 120 may include a pressure meter (not shown) which is disposed in and/or connected to components of the air suction unit 131. The pressure meter is configured to measure an internal pressure in the air tank 132.

When outside air is suctioned by using the plurality of compressors 133a, 133b, 133c and 133d as described above for a total amount of suctioned air, an overall volume and a weight of the air suction unit 131 may decrease as compared to a structure where one single compressor suctions air in the same total amount as that air suctioned by the plurality of compressors 133a, 133b, 133c and 133d.

Figure 4:
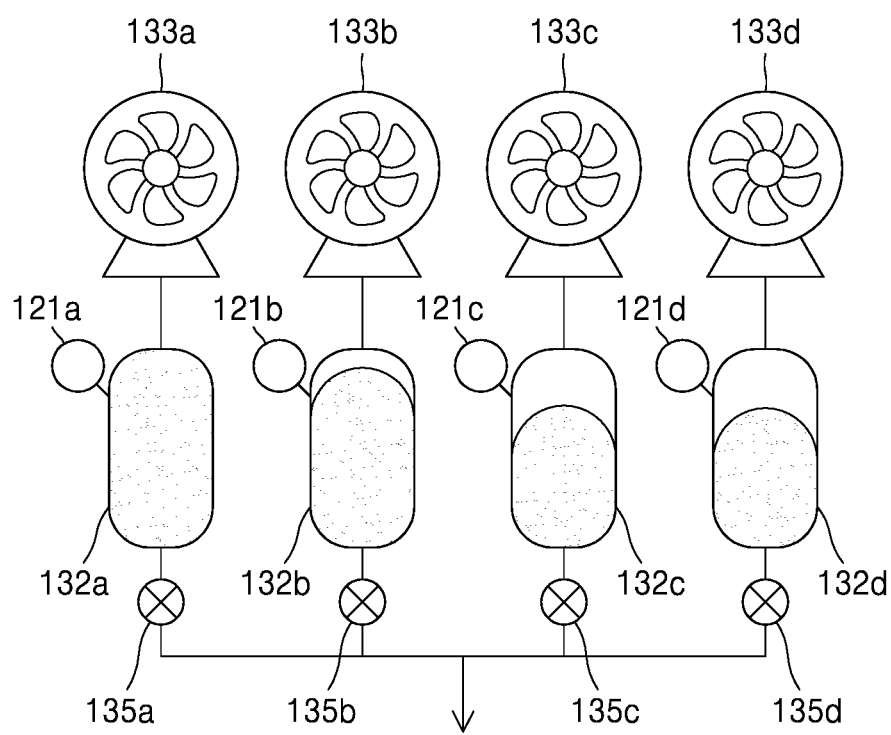
FIG. 4 is a schematic view of another exemplary embodiment of a structure of an air suction unit having a multi module structure according to the invention.

FIG. 4 is a schematic view that shows another exemplary embodiment of a structure of the air suction unit 131 having a multi module structure according to the invention. Referring to FIG. 4, the air suction unit 131 may include a plurality of air tanks 132a, 132b, 132c, and 132d that store air provided thereto; a plurality of compressors 133a, 133b, 133c and 133d that retrieve air from outside thereof or from outside the metal air battery 100 and are respectively connected to the plurality of air tanks 132a, 132b, 132c and 132d; and a plurality of output valves 135a, 135b, 135c and 135d that respectively control an amount of air output from the plurality of air tanks 132a, 132b, 132c and 132d according to control of the controller 140. The plurality of output valves 135a, 135b, 135c and 135d may then be commonly connected to another component such as the air purification unit 136 via a common channel. Different shadings in the air tanks 132a, 132b, 132c, and 132d of FIG. 4 illustrate examples of amount of air stored in the air tanks 132a, 132b, 132c, and 132d. A single air-handling module may include a compressor, an air tank and an output value which are connected to each other in series but the invention is not limited thereto. In an exemplary embodiment, a single air-handling module may include a compressor, an air tank and/or an output valve among a plurality thereof connected to each other in a parallel arrangement.

The sensor unit 120 may include a plurality of pressure meters 121a, 121b, 121c and 121d. The plurality of pressure meters 121a, 121b, 121c and 121d may be disposed in and/or connected to components of the air suction unit 131. Each of the pressure meters 121a, 121b, 121c and 121d is configured to measure an internal pressure in a corresponding air tank of the plurality of air tanks 132a, 132b, 132c and 132d. Although FIG. 4 shows that the air suction unit 131 includes four air tanks 132a, 132b, 132c and 132d as an example, but embodiments are not limited thereto. Also, although FIG. 4 shows that one of the compressors 133a, 133b, 133c and 133d is connected to one of the air tanks 132a, 132b, 132c and 132d, a plurality of compressors may be commonly connected to a single one of the air tanks among air tanks 132a, 132b, 132c and 132d as in FIG. 3. As shown in FIG. 4, the plurality of air tanks 132a, 132b, 132c and 132d may be in a parallel arrangement. That is, air output from the plurality of air tanks 132a, 132b, 132c and 132d may be supplied to the air purification unit 136 through one air channel.

In the structure shown in FIG. 4, the controller 140 connected to the air supply unit 130 may receive internal pressure information of the plurality of air tanks 132a, 132b, 132c and 132d provided from the plurality of pressure meters 121a, 121b, 121c and 121d, may control the plurality of output valves 135a, 135b, 135c and 135d based on the pressure information, and thus may control an amount of air output from the plurality of air tanks 132a, 132b, 132c and 132d. In an exemplary embodiment, for example, the controller 140 may control an air amount output from an air tank having the highest internal pressure among the plurality of air tanks 132a, 132b, 132c and 132d to be a maximum amount and may control an air amount output from an air tank having the lowest internal pressure among the plurality of air tanks 132a, 132b, 132c and 132d to be a minimum amount. Also, the controller 140 may close an output valve of an air tank having an internal pressure less than a reference pressure among the plurality of air tanks 132a, 132b, 132c and 132d to stop discharging air and put the air tank in an idle state until the internal pressure increases to a pressure higher than the reference pressure. Also, the controller 140 may open an output valve of the air tank having the highest internal pressure among the plurality of air tanks 132a, 132b, 132c and 132d and may close output valves of the other air tanks.

Thereafter, the controller 140 may select an air tank that outputs air in real-time according to a change in an internal pressure of the plurality of air tanks 132a, 132b, 132c and 132d. Also, the controller 140 may only open output valves of at least two air tanks having the highest internal pressures among the plurality of air tanks 132a, 132b, 132c and 132d and may close output valves of the other air tanks. That is, the controller 140 connected to the air supply unit 130 may open and close the output valves of the air support unit 130 in various combinations to control an amount of air output from the plurality of air tanks 132a, 132b, 132c and 132d.

Also, the controller 140 may control operation of the plurality of compressors 133a, 133b, 133c and 133d according to internal pressure information of the plurality of air tanks 132a, 132b, 132c and 132d from the sensor unit 120. In an exemplary embodiment, for example, the controller 140 may drive the compressors connected to the air tanks having internal pressures lower than the reference pressure among the plurality of air tanks 132a, 132b, 132c, and 132d to be a maximum pressure and may stop operation of the compressors connected to the air tanks having internal pressures that reached the maximum pressure or may drive the operation of such air tank at a minimum (e.g., for a minimum time, under minimum power, etc.).

According to one or more embodiment shown in FIG. 4, the air suction unit 131 may actively respond with respect to an internal pressure status of the plurality of air tanks 132a, 132b, 132c and 132d, and thus, may continuously supply a constant amount or a minimum amount of air to the air purification unit 136 without ceasing to supply air. Also, an overall size of the air suction unit 131 may decrease compared to when only a single one air tank and a single one compressor are used.

Although FIG. 4 shows that all sizes of the plurality of compressors 133a, 133b, 133c and 133d are the same and loads (e.g., air-handling capacity) of the plurality of compressors 133a, 133b, 133c and 133d are the same, sizes of the plurality of compressors 133a, 133b, 133c, and 133d may be different from each other and loads of the plurality of compressors 133a, 133b, 133c, and 133d may be different from each other. In the drawings, sizes of the compressors relative to each other are used to indicate relative air-handling capacities therebetween.

Figure 5:
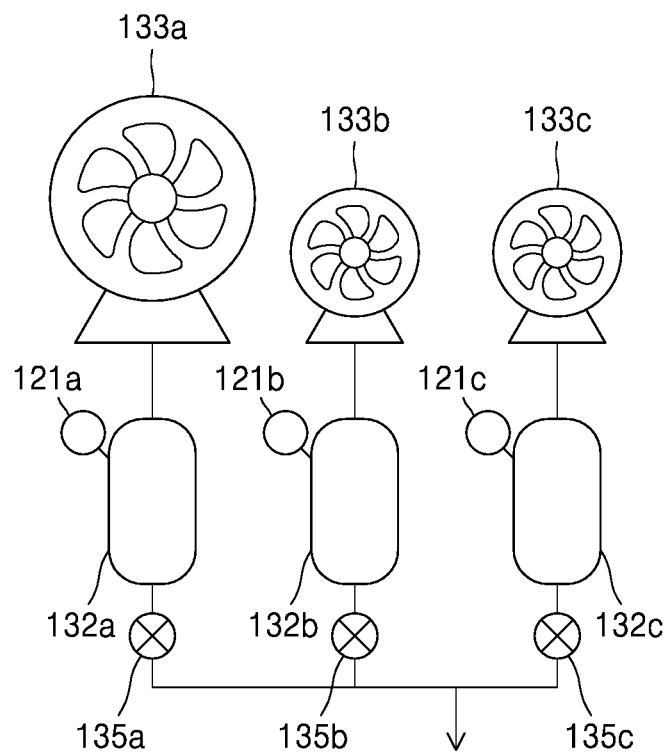
FIG. 5 is a schematic view of still another exemplary embodiment of structure of an air suction unit having a multi module structure according to the invention.

FIG. 5 is a schematic view of still another exemplary embodiment of a structure of the air suction unit 131 having a multi module structure according to the invention. Referring to FIG. 5, the air suction unit 131 may include a plurality of air tanks 132a, 132b and 132c; a plurality of compressors 133a, 133b and 133c having different sizes from each other and respectively connected to the plurality of air tanks 132a, 132b and 132c; and a plurality of output valves 135a, 135b and 135c that respectively control an amount of air output from the air tanks 132a, 132b and 132c according to control of the controller 140. Also the sensor unit 120 may include a plurality of pressure meters 121a, 121b and 121c, each being configured to measure an internal pressure in a corresponding air tank of the plurality of air tanks 132a, 132b and 132c.

Although FIG. 5 shows that a size of one compressor 133a is the largest relative to the remaining compressors, and two other compressors 133b and 133c with smaller sizes than that of the compressor 133a have the same sizes as each other, embodiments are not limited thereto. In an exemplary embodiment, for example, all sizes of the plurality of compressors 133a, 133b and 133c may be different from each other. Also, there may be two compressors having the largest size among the plurality of compressors 133a, 133b and 133c. Also, FIG. 5 shows that the plurality of air tanks 132a, 132b and 132c have the same sizes, but when sizes of the plurality of compressors 133a, 133b and 133c are different from each other, capacities (or volumes) of the air tanks 132a, 132b and 132c respectively connected to the compressors 133a, 133b and 133c and performance of the output valves 135a, 135b and 135c may selected differently depending on operation of the air suction unit 130.

Referring to the structure of FIG. 5, air is mainly supplied from the air tank 132a connected to the compressor 133a having the largest size among the plurality of compressors 133a, 133b and 133c. To reach a certain amount of air, a supplemental amount of air other than the air supplied from the largest air tank may be respectively filled by using the air tanks 132b and 132c connected to the compressors 133b and 133c having the relatively smaller sizes. Also, in consideration of the sizes of the compressors and/or air tanks, the plurality of compressors 133a, 133b and 133c may be selectively combined to supply air according to change in an amount or air used in the battery module 110.

Figure 6:
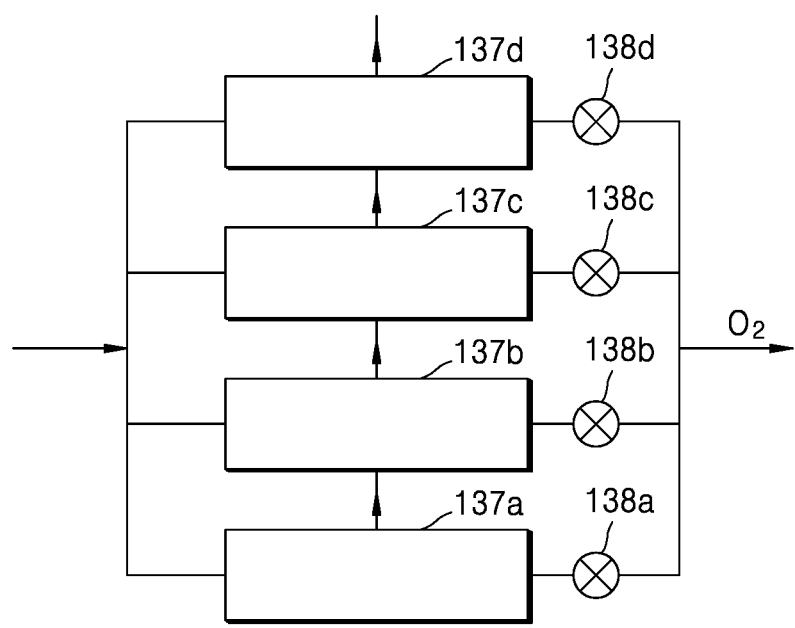
FIG. 6 is a schematic view of an exemplary embodiment of a structure of an air purification unit having a multi module structure according to the invention.

The air purification unit 136 may be manufactured in a multi module structure. FIG. 6 is a schematic view of an exemplary embodiment of a structure of the air purification unit 136 having a multi module structure according to the invention. Referring to FIG. 6, the air purification unit 136 may include a plurality of air purification modules 137a, 137b, 137c and 137d in a parallel arrangement. Also, the air purification unit 136 may further include a plurality of valves 138a, 138b, 138c and 138d that are respectively connected to an air outlet port of the plurality of air purification modules 137a, 137b, 137c and 137d. Although FIG. 6 shows four air purification modules 137a, 137b, 137c and 137d in a parallel arrangement as an example, embodiments are not limited thereto. Also, although FIG. 6 shows the plurality of air purification modules 137a, 137b, 137c and 137d having the same size as each other for convenience of description, sizes and corresponding capacities of the plurality of air purification modules 137a, 137b, 137c and 137d may be different from each other. A single air-handling module may include an air purification module and a valve which are connected to each other in series but the invention is not limited thereto. In an exemplary embodiment, a single air-handling module may include an air purification module or a valve among a plurality thereof connected to each other in a parallel arrangement.

Air supplied from the air suction unit 131 is input to the plurality of air purification modules 137a, 137b, 137c and 137d of the air purification unit 136. Then, the air purification modules 137a, 137b, 137c and 137d may operate independent from each other and thus may generate dry air, from which moisture and nitrogen are removed. Such generated dry air has an increased oxygen concentration and is transmitted through the valves 138a, 138b, 138c and 138d respectively connected to the air purification modules 137a, 137b, 137c and 137d. Also, each of the air purification modules 137a, 137b, 137c and 137d may output the removed moisture and nitrogen to the outside of the metal air battery 100 such as through a separate outlet port (refer to 136a of FIG. 2). The dry air having an increased oxygen concentration output from the plurality of air purification modules 137a, 137b, 137c and 137d may be supplied to the battery module 110 through one common air channel (refer to 136b of FIG. 2).

In an exemplary embodiment, for example, each of the air purification modules 137a, 137b, 137c and 137d may independently remove moisture and nitrogen from air supplied thereto by adsorption and desorption, or may remove moisture and nitrogen from air supplied thereto by separation membrane.

Figure 7:
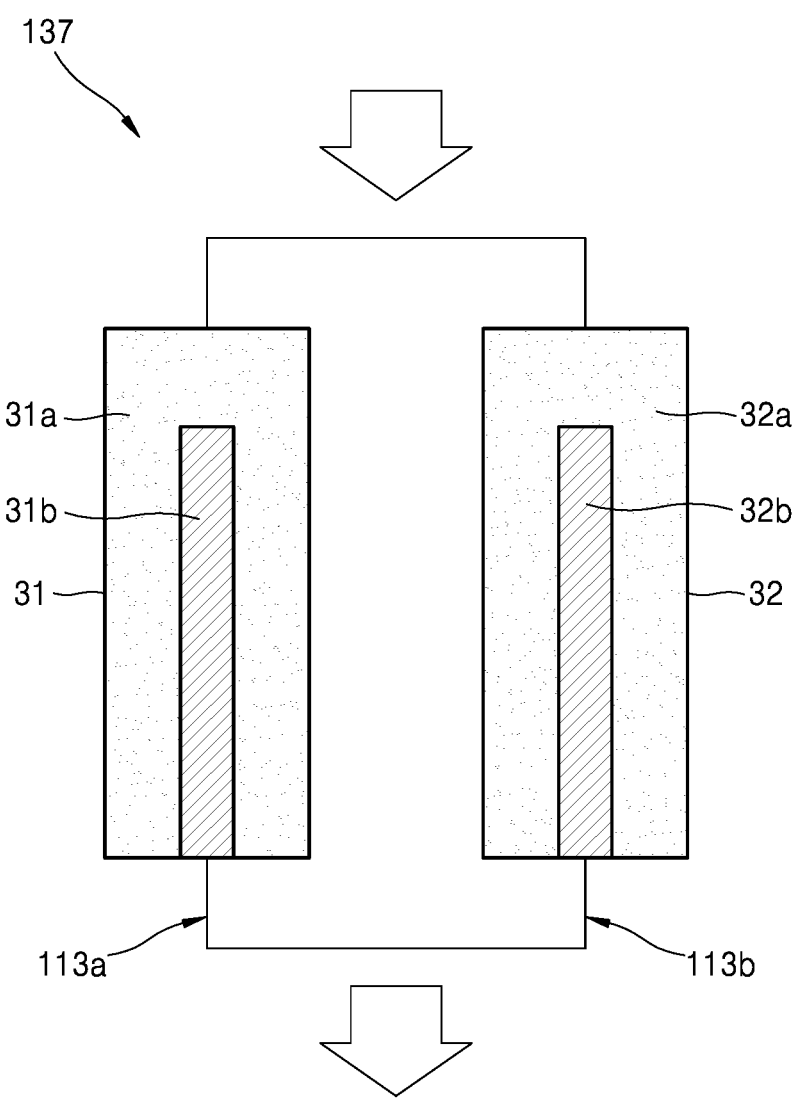
FIG. 7 is a schematic diagram of an exemplary embodiment of a structure of an air purification module of the air purification unit shown in FIG. 6.

FIG. 7 is a block diagram that schematically illustrates an exemplary embodiment of a structure of one single air purification module 137 of the air purification unit 136 shown in FIG. 6. The air purification module 137 shown in FIG. 7 is configured to filter moisture and nitrogen by adsorption and desorption. Referring to FIG. 7, the air purification module 137 may include a first adsorption unit 31 and a second adsorption unit 32 in a parallel arrangement with each other. The first adsorption unit 31 may include a first adsorbent 31a and a first regeneration unit 31b, and the second adsorption unit 32 may include a second adsorbent 32a and a second regeneration unit 32b.

The first adsorbent 31a and the second adsorbent 32a may function to adsorb impurities such as nitrogen from air. In an exemplary embodiment, for example, the first adsorbent 31a and the second adsorbent 32a may include one selected from zeolite LiX, alumina, a metal-organic framework ("MOF"), a zeolite imidazolate framework ("ZIF"), and combinations including two or more thereof. The MOF may include a metal ion or a metal cluster which is coordinated to an organic molecule and may define a crystalline compound forming a primary, secondary or tertiary porous structure. In addition, the ZIF may mean a nanoporous compound including a tetrahedral cluster of $MN_4$ that is linked by an imidazolate ligand (where M is a metal).

The first regeneration unit 31b and the second regeneration unit 32b may function to regenerate the saturated first adsorbent 31a and the saturated second adsorbent 32a, respectively, so that the saturated first adsorbent 31a and the saturated second adsorbent 32a may again adsorb impurities from air. In order to regenerate the saturated first adsorbent 31a and the saturated second adsorbent 32a, the first regeneration unit 31b and the second regeneration unit 32b may be configured to adjust an inner pressure and/or temperature of the first adsorption unit 31 and an inner pressure or temperature of the second adsorption unit 32, respectively.

The air purification module 137 having the aforementioned structure may operate, for example, in a pressure swing adsorption ("PSA") method. In an exemplary embodiment, for example, impurities such as moisture and nitrogen may be adsorbed to the first adsorbent 31*a* by increasing the inner pressure of the first adsorption unit 31 to operate the first adsorption unit 31. The remaining air from which the impurities have been removed and having an increased oxygen concentration may be output from the first adsorption unit 31 to a first outlet port 113*a*. Meanwhile, the moisture and nitrogen adsorbed to the second adsorbent 32*a* may be desorbed from the second adsorbent 32*a* by decreasing the inner pressure of the second adsorption unit 32, and the desorbed moisture and nitrogen may be discharged from the second adsorption unit 32 to a second outlet port 113*b*.

When the first adsorbent 31*a* is saturated, the inner pressure of the first adsorption unit 31 may be decreased, and the inner pressure of the second adsorption unit 32 may be increased. In this case, a desorbing operation may be performed in the first adsorption unit 31, and an adsorbing operation may be performed in the second adsorption unit 32. In such a manner, the first adsorption unit 31 and the second adsorption unit 32 may alternately operate. At this time, the oxygen concentration in the air supplied to the battery module 110 may be adjusted by controlling the inner pressure of each of the first adsorption unit 31 and the second adsorption unit 32.

However, an operation manner of the air purification module 137 is not necessarily limited to the PSA method. For example, in addition to the PSA method, the air purification module 137 may be configured to operate in a thermal swing adsorption ("TSA") method, a pressure thermal swing adsorption ("PTSA") method, a vacuum swing adsorption ("VSA") method, or two or more thereof. The PSA method means a technology of primarily adsorbing or capturing a specific gas to the first adsorbent 31*a* and the second adsorbent 32*a* at a high partial pressure, and desorbing or discharging the specific gas when the partial pressure is decreased. In addition, the TSA method means a technology of primarily adsorbing or capturing a specific gas to the first and second adsorbents 31*a* and 32*a* at room temperature, and desorbing or discharging the specific gas when the temperature is increased. The PTSA method means a technology in which the PSA method and the TSA method are combined. Finally, the VSA method means a technology of primarily adsorbing or capturing a specific gas to the first and second adsorbents 31*a* and 32*a* at about an atmospheric pressure, and desorbing or discharging the specific gas under a vacuum.

Figure 8:
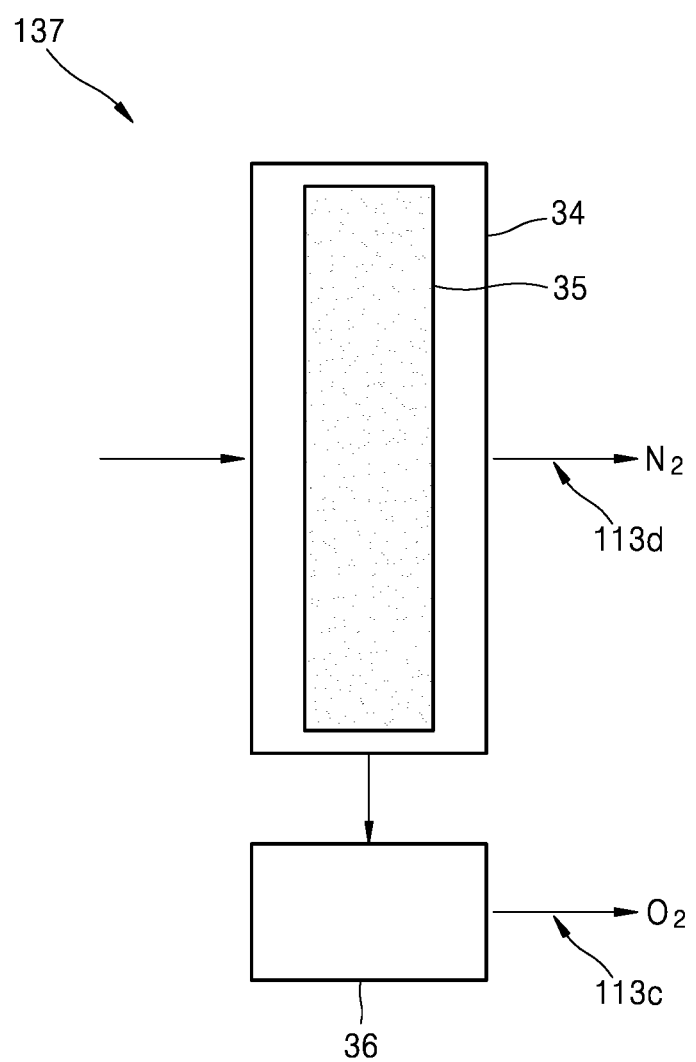
FIG. 8 is a schematic diagram of another exemplary embodiment of a structure of an air purification module of the air purification unit shown in FIG. 6.

FIG. 8 is a schematic block diagram of another exemplary embodiment of a structure of one single air purification module 137 of the air purification unit 136 illustrated in FIG. 6, according to the invention. The air purification module 137 illustrated in FIG. 8 may be configured to filter oxygen via a separation membrane method. Referring to FIG. 8, the air purification module 137 may include a pump 36 and an oxygen separation module 34 which is configured to separate nitrogen and oxygen in air supplied thereto. The pump 36 may be connected to the oxygen separation module 34. A membrane 35 may be disposed within the oxygen separation module 34 to selectively separate oxygen. Although FIG. 8 shows one membrane 35 for convenience, a plurality of membranes 35 may be disposed in a multi-layered structure. In an exemplary embodiment, for example, the membrane 35 may include a BSCF oxide ($Ba_{0.5}Sr_{0.5}Co_{0.8}Fe_{0.2}O_{3-\delta}$).

The air suctioned by the air suction unit 131 may be supplied to the oxygen separation module 34, and the membrane 35 in the oxygen separation module 34 may filter oxygen from the air. A gas remaining after oxygen is separated in the oxygen separation module 34 may be discharged to the outside through the second outlet port 113*c*. The pump 36 may supply oxygen to the battery module 110 through the first outlet port 113*d* by emitting oxygen from the oxygen separation module 34.

Figure 9:
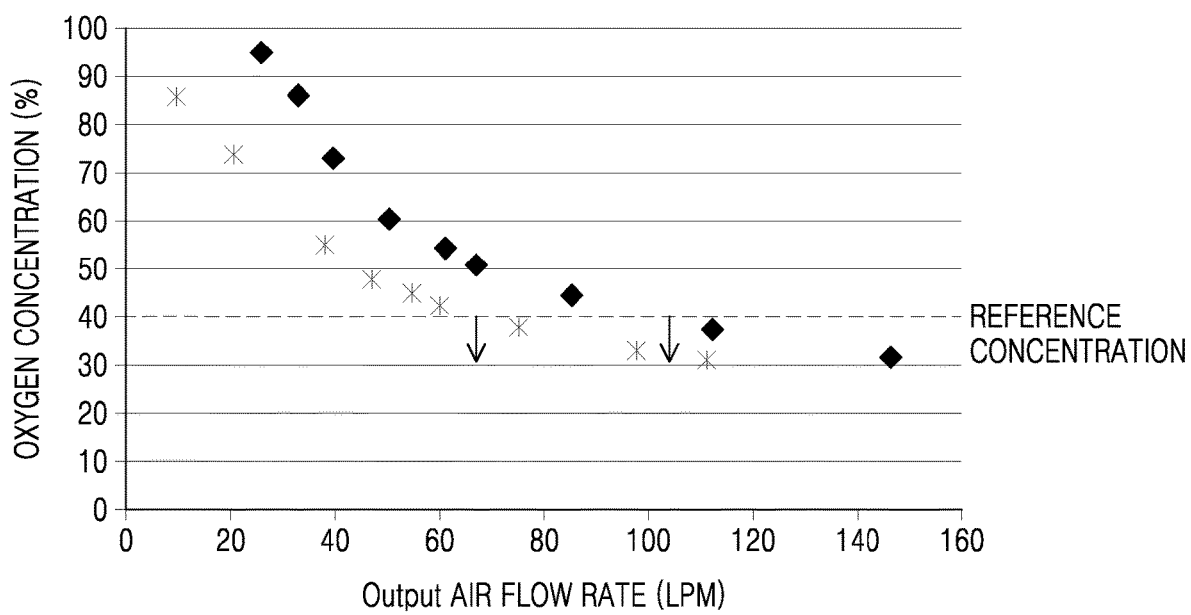
FIGS. 9 and 10 are graphs showing an effect exhibited when an air purification unit has a multi module structure.
Figure 10:
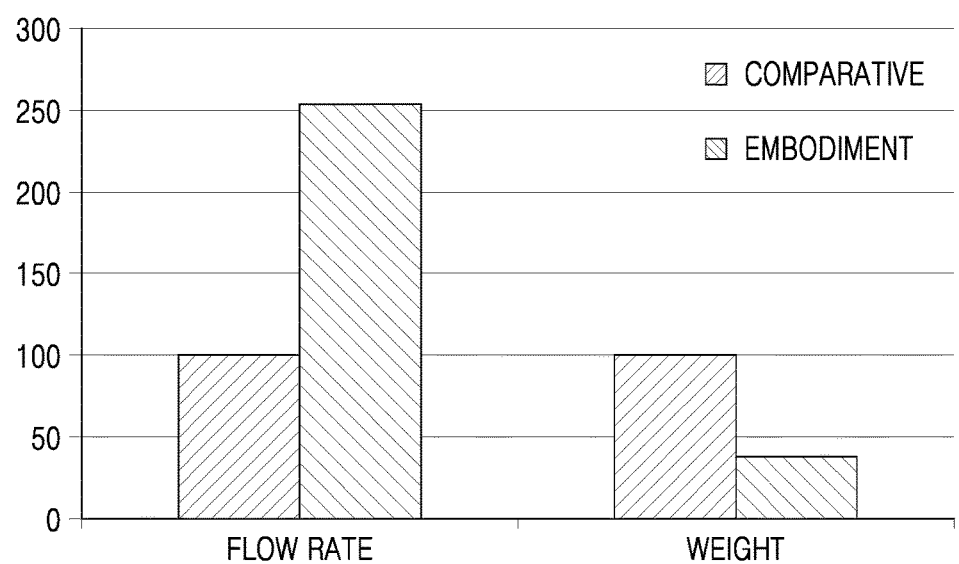

FIGS. 9 and 10 are graphs that show effects when the air purification unit 136 has a multi module structure. First, FIG. 9 shows a relationship between an oxygen concentration in percent (%) in air output from the air purification unit 136 and an air flow amount in liters per minute (LPM). In FIG. 9, indicates the results of a comparative example using one adsorption module, '♦' indicates the results of an example using one adsorption module from a multi module structure which individually has a ¼ load (e.g., capacity) of the adsorption module used in the comparative example. Referring to the graph of FIG. 9, when an oxygen concentration in air supplied to a battery module (refer to 110 in FIG. 1) is 40%, the comparative example may supply air at about 110 LPM. On the other hand, despite using one adsorption module from a multi module structure which individually has a ¼ capacity of the adsorption module used in the comparative example, the example may supply air at about 70 LPM when an oxygen concentration in air supplied to the battery module is 40%. Therefore, when two or more adsorption modules having a ¼ capacity of the adsorption module used in the comparative example are used in a parallel arrangement to form a multi module structure, performance of the overall air purification unit 136 may improve compared to that of the single one air purification unit of the comparative example.

Referring to the arbitrary units in the graph of FIG. 10, when the total capacities of the adsorption modules of the comparative example and the example are the same, a weight of the air purification unit 136 of one or more exemplary embodiment may decrease about 60% compared to that of the comparative example. A flow rate of one or more exemplary embodiment of the air purification unit 136 may increase to be about 2.5 times higher than that of the comparative example. Therefore, when the air purification unit 136 is manufactured to have a multi module structure according to one or more embodiment of the invention, a weight and a volume of the metal air battery 100 may decrease, and thus an energy density of the metal air battery 100 may increase.

Although one or more exemplary embodiment of the metal air battery including a multi module air supply unit has been described above by referring to the accompanied drawings, it should be understood that embodiments described herein should be considered in a descriptive sense only and not for purposes of limitation. Descriptions of features within each embodiment should typically be considered as available for other similar features in other embodiments.

While one or more embodiments have been described with reference to the figures, it will be understood by those of ordinary skill in the art that various changes in form and details may be made therein without departing from the spirit and scope as defined by the following claims.

What is claimed is:

1. A metal air battery comprising:
 a battery module which generates electricity, the battery module comprising a metal air cell which uses oxygen from air as a cathode active material to generate the electricity; and
 an air supply unit which is connected to the battery module and supplies the air to the battery module,
 wherein the air supply unit comprises:
 an air suction unit which suctions air from outside, and an air purification unit connected to the air suction unit to receive suctioned air therefrom and remove impurities from the suctioned air, wherein the air purification unit comprises a plurality of first air-handling modules connected in a parallel arrangement with each other to define a multi module structure of the air purification unit, and wherein the air suction unit is commonly connected to each of the plurality of first air-handling modules connected in the parallel arrangement with each other of the air purification unit.

2. The metal air battery of claim 1, wherein the air suction unit comprises a plurality of second air-handling modules connected in a parallel arrangement with each other to define a multi module structure of the air suction unit, and each of the plurality of first air-handling modules of the air purification unit is commonly connected to each of the plurality of second air-handling modules.

3. The metal air battery of claim 2, wherein the air suction unit further comprises:

one single air tank which stores the suctioned air; and as the plurality of second air-handling modules of the air suction unit, a plurality of compressors connected in a parallel arrangement with each other, each compressor being connected to the one single air tank to suction air from the outside and provide the suctioned air to the one single air tank.

4. The metal air battery of claim 2, wherein the air suction unit further comprises:

a plurality of air tanks each of which stores air;

as the plurality of second air-handling modules of the air suction unit, a plurality of compressors connected in a parallel arrangement with each other, the compressors being respectively connected to the plurality of air tanks to suction air from the outside and provide the suctioned air to a corresponding air tank; and a plurality of valves respectively connected to the plurality of air tanks to control an amount of air output from the plurality of air tanks, and each of the plurality of first air-handling modules of the air purification unit is commonly connected to each of the plurality of air tanks, each of the plurality of compressors connected in the parallel arrangement with each other and each of the plurality of valves of the air suction unit.

5. The metal air battery of claim 4, further comprising:

a sensor unit comprising a plurality of pressure meters respectively connected to the plurality of air tanks of the air suction unit to measure an internal pressure in the corresponding air tank, wherein each of the plurality of first air-handling modules of the air purification unit is commonly connected to each of the plurality of pressure meters of the sensor unit.

6. The metal air battery of claim 5, further comprising:

a controller connected to the sensor unit and to the air supply unit to receive internal pressure information of the plurality of air tanks of the air suction unit provided from the plurality of pressure meters of the sensor unit, wherein such controller controls the plurality of valves of the air suction unit based on the internal pressure information to control the amount of air output from the plurality of air tanks.

7. The metal air battery of claim 6, wherein from among the plurality of air tanks of the air supply unit, the controller further controls the amount of air output from an air tank having the highest internal pressure to be a maximum amount, and controls the amount of air output from an air tank having the lowest internal pressure to be a minimum amount.

8. The metal air battery of claim 6, wherein from among the plurality of air tanks of the air supply unit, the controller further ceases the amount of air output from an air tank having an internal pressure less than a reference pressure by closing a valve connected to such air tank.

9. The metal air battery of claim 6, wherein from among the plurality of air tanks of the air supply unit, the controller further opens a valve of an air tank having the highest internal pressure and closes valves of remaining air tanks.

10. The metal air battery of claim 9, wherein the controller further opens the valve of the air tank having the highest internal pressure and closes the valves of remaining air tanks according to change of the internal pressure of the plurality of air tanks.

11. The metal air battery of claim 6, wherein from among the plurality of air tanks respectively connected to the plurality of compressors of the air supply unit, the controller operates a compressor connected to an air tank having an internal pressure less than a reference pressure until such air tank reaches a maximum pressure and ceases operation of a compressor connected to an air tank having an internal pressure which has reached the maximum pressure.

12. The metal air battery of claim 4, wherein air-handling capacities of the plurality of compressors are same.

13. The metal air battery of claim 4, wherein air-handling capacities of the plurality of compressors are different from each other.

14. The metal air battery of claim 4, wherein capacities of the plurality of air tanks are different from each other.

15. The metal air battery of claim 1, wherein the air purification unit comprises as the plurality of first air-handling modules thereof, a plurality of air purifiers connected in a parallel arrangement with each other, each air purifier receiving the suctioned air from the air suction unit to separate the impurities from the suctioned air and output a remainder of the suctioned air to the battery module.

16. The metal air battery of claim 15, wherein the plurality of air purifiers removes moisture and nitrogen from air by adsorption-desorption or removes moisture and nitrogen from air by an impurity separator.

17. The metal air battery of claim 16, wherein for the adsorption-desorption, each of the air purifiers comprises a first adsorption unit and a second adsorption unit each of which separates the impurities from the suctioned air, the first adsorption unit comprises a first adsorbent which adsorb impurities and a first regeneration unit which regenerates the first adsorbent, and the second adsorption unit comprises a second adsorbent which adsorbs the impurities and a second regeneration unit which regenerates the second adsorbent.

18. The metal air battery of claim 17, wherein each of the plurality of air purifiers operates according to a pressure swing adsorption method, a thermal swing adsorption method, a pressure thermal swing adsorption method or a vacuum swing adsorption method.

19. The metal air battery of claim 15, wherein each of the plurality of air purifiers comprises:

an oxygen separator including a separation member, wherein such oxygen separator separates nitrogen from the suctioned air, and a pump connected to the oxygen separator to output the suctioned air having the nitrogen removed therefrom to the battery module.

* * * * *